United States Patent Office 2,938,772
Patented May 31, 1960

2,938,772
METHOD OF PRODUCING EXTREMELY PURE SILICON

Eduard Enk and Julius Nickl, Burghausen, Upper Bavaria, Germany, assignors to Wacker-Chemie G.m.b.H., Munich, Germany, a German firm No Drawing. Filed July 19, 1956, Ser. No. 598,756

Claims priority, application Germany July 29, 1955

12 Claims. (Cl. 23—223.5)

The present invention relates to a method of producing extremely pure silicon.

Extremely pure silicon is needed in increasing quantities for commercial and scientific purposes, particularly for making electrical transistors. It is desired that the silicon be obtained in crystallized and dense form and not amorphous or as a partly crystallized powder as is the case when the silicon is separated in the conventional manner by decomposition at high temperature of halogen silanes containing hydrogen. The conventional processes yield an amorphous powder having a highly active surface which eagerly absorbs impurities. This powder is not readily suitable for making transistors and must be specially treated whereby introduction of impurities is unavoidable.

We have found a simple process for conducting the high temperature decomposition of halogen silanes containing hydrogen so that extremely pure crystallized silicon is obtained which is excellently suited for making transistors. The process consists essentially of conducting vapor of hydrogen-containing halogen silanes through a reaction vessel in which the vapor is first exposed to a gradually rising temperature, thereupon to a temperature of between 800° C. and 1150° C. for producing purest silicon, and thereupon to a falling temperature. In this way a dense crystallized extremely pure silicon is obtained at an economically favorable yield which can be readily worked to semi-conductors. The new process prevents formation of decomposition products other than silicon or of traces of other compounds which are contained in the starting material, which products and compounds contaminate the silicon crystals.

Preferably di- or trichlorosilane or tribromosilane and mixtures thereof are used as starting material.

In the simplest form of executing the process according to the invention an electrically heated quartz tube is used, the center of which has a temperature of 800° C. to 1150° C. The halogen silane vapors, if desired, together with an inert gas as, for example, argon, hydrogen, nitrogen, and the like are conducted through the quartz tube so that their temperature is gradually raised to 800° C. to 1150° C. and the halogen silanes are decomposed, purest, crystallized silicon being deposited on the interior wall of the tube. If a body is placed inside the tube in the zone of highest temperature, extremely pure, crystallized silicon is also deposited on this body. The body which may have the shape of a rod or of a tube preferably consists of a material which does not impair the purity of the silicon, for example, extremely pure silicon, silicon dioxide, silicon carbide or carbides of other metals, as molybdenum and tungsten. The body as well as the entire reaction vessel may be heated by electric high frequency current. When the desired amount of extremely pure silicon has been produced the inert gas is conducted through the tube until this gas does not contain any hydrolizable compounds. By periodic removal of the formed silicon at the locality of separation and subsequent sluicing of the silicon from the reaction chamber the process can be performed continuously. Prior to the working the silicon crystals into semi-conductors they are preferably treated first with hydrofluoric acid and thereupon with diluted liquor.

Example 1

5 grams to 15 grams trichlorosilane vapor and 0.18 liter to 0.9 liter argon as carrier gas were conducted per hour through a quartz glass tube of 60 cm. length and 20 mm. internal diameter. When the tube was completely filled with the gas mixture a portion of about 15 cm. to 20 cm. length substantially in the middle of the tube was heated to 1020° C. The temperature diminished gradually in the adjacent parts of the tube. Extremely pure and dense crystallized silicon was separated in the zone of the tube whose temperature was between 850° C. and 1020° C. The gaseous products of decomposition leaving the tube were cooled and separated. When the desired extremely pure silicon was formed supply of trichlorosilane vapor was interrupted and the tube was scavenged by means of 0.9 liter to 1.5 liters argon per hour until the latter was free of hydrolizable compounds. Thereupon the poly-crystalline silicon was removed from the tube and washed with hydrofluoric acid and thereafter with diluted caustic soda. 0.23 gram to 0.72 gram extremely pure silicon was obtained per hour. The obtained silicon, if spectrally analyzed, showed only its own lines and could readily be worked to semi-conductors and transistors.

The apparatus described above was used also in the following examples 2 to 6.

Example 2

Tribromosilane was used as halogen silane and purified nitrogen was used as carrier gas. Decomposition occurred at a temperature of 890° C. to 1000° C. Spectrometically pure crystallized silicon was separated.

Throughput:
Tribromosilane____ 10 grams to 30 grams per hour
Nitrogen _____ 0.18 liter to 1.2 liter per hour
Amount of separated
silicon _____ 0.24 gram to 0.75 gram per hour

Example 3a

Argon was used as carrier gas and trichlorosilane was decomposed under a pressure of 0.26 kg./cm.$^2$. A silicon rod of 5/16" diameter and 15 cm. length was placed in the quartz glass tube described in Example 1, and heated to 980° C. Spectrally pure silicon was separated in finely crystallized form onto the rod.

Throughput:
Trichlorosilane ____ 2 grams to 10 grams per hour
Argon _____ 0.05 liter to 0.5 liter per hour
Amount of separated
silicon _____ 0.1 gram to 0.47 gram per hour

Example 3b

Decomposition was effected at atmospheric pressure and coarse crystalline spectrally pure silicon was deposited on a rod of 5/16" diameter and 15 cm. length which was heated to 980° C.

Throughput:
Trichlorosilane ____ 5 grams to 15 grams per hour
Argon _____ 0.18 liter to 0.9 liter per hour
Amount of separated
silicon_____ 0.2 gram to 0.72 gram per hour

Example 4a

In order to avoid the expense of thoroughly purifying a carrier gas trichlorosilane vapor was heated alone to between 850° C. and 950° C. at a total pressure between 1.0 kg./cm.² and 0.25 kg./cm.². Spectrally pure, loose, crystalline silicon was obtained. The size of the crystals is smaller, if the pressure is lower.

Throughput: Trichloro-
  silane _____ 2 grams to 10 grams per hour
Amount of separated
  silicon _____ 0.1 gram to 0.48 gram per hour

*Example 4b*

Trichlorosilane vapor was heated to 1050° C. at a total pressure between 1.0 kg./cm.² and 3.5 kg./cm.². The separated silicon is coarse crystalline and denser than the one of Example 4a.

Throughput: Trichloro-
  silane _____ 5 grams to 15 grams per hour
Amount of separated
  silicon _____ 0.2 gram to 0.7 gram per hour

*Example 5*

Tribromosilane was decomposed at a total pressure of 1.7 kg./cm.² and 2.0 kg./cm.² and at a temperature of 1010° C. Argon was used as a carrier gas. Very dense, crystalline, and extremely pure silicon was obtained.

Throughput:
  Tribromosilane __ 10 grams to 30 grams per hour
  Argon _____ 0.1 liter to 0.5 liter per hour
Amount of separated
  silicon _____ 0.2 gram to 0.75 gram per hour

*Example 6*

A mixture of 90% trichlorosilane and 10% dichlorosilane was decomposed at a temperature between 880° C. and 1000° C. and at atmospheric pressure. Pure, dense, crystalline silicon was obtained.

Throughput: Mixture
  of trichlorosilane and
  dichlorosilane _____ 5 grams to 15 grams per hour
Amount of separated
  silicon _____ 0.25 gram to 0.8 gram per hour

*Example 7a*

Whereas in Examples 1 to 6 the reaction tube was heated from the outside, in the present example the heat for the decomposition was produced of high frequency electric current. The reaction tube was 50 cm. long, made of quartz glass, and had an internal diameter of 30 mm. A 20 cm. long silicon rod of 8 mm. diameter was placed inside the tube and heated by means of a high frequency electric generator to between 850° C. and 1000° C. while trichlorosilane vapor diluted with argon was conducted along the rod. The separated silicon deposited almost exclusively on the hot silicon rod. A light gray, very loose, and extremely pure silicon was obtained.

Throughput:
  Trichlorosilane __ 5 grams to 30 grams per hour
  Argon _____ 0.1 liter to 0.5 liter per hour
Amount of separated
  silicon _____ 0.2 gram to 1.4 grams per hour

*Example 7b*

The same apparatus was used as in Example 7a; the rod on which the silicon was deposited, however, was made of sintered silicon carbide and was heated to between 850° C. and 1000° C. Loose and extremely pure silicon was obtained.

Throughput:
  Trichlorosilane ___ 5 grams to 30 grams per hour
  Argon _____ 0.1 liter to 0.5 liter per hour
Amount of separated
  silicon _____ 0.2 gram to 1.4 grams per hour

*Example 8a*

The same apparatus was used in Example 7a; however, the rod was only 10 cm. long and it was not heated uniformly over its whole length, but heating was slowly moved from one end of the rod to its other end. The rod was elongated by deposited silicon. When the extension of the rod formed by the deposited silicon reached a length of about 8 cm. to 10 cm., the extension was separated from the original rod and sluiced out of the reaction tube. This process was repeated, resulting in a substantially continuous production of pure silicon.

Throughput:
  Trichlorosilane ___ 5 grams to 30 grams per hour
  Argon _____ 0.1 liter to 0.2 liter per hour
Amount of separated
  silicon _____ 0.2 gram to 1.3 grams per hour
Decomposition temperature_____ 850° C. to 1000° C.

*Example 8b*

The same apparatus was used as in Example 7a; the rod, however, on which the pure silicon was deposited was 10 cm. long, was made of tungsten carbide and was heated to between 850° C. and 1000° C. Hydrogen was used as a carrier gas.

Throughput:
  Trichlorosilane ___ 5 grams to 30 grams per hour
  Hydrogen _____ 0.1 liter to 0.2 liter per hour
Amount of separated
  silicon _____ 0.2 gram to 1.4 grams per hour

*Example 8c*

In the apparatus described in Example 8a tribromosilane vapor was decomposed at between 900° C. and 1000° C., using argon as carrier gas. Extremely pure, crystallized, but not very dense silicon was obtained.

Throughput:
  Tribromosilane __ 5 grams to 30 grams per hour
  Argon _____ 0.1 liter to 0.2 liter per hour
Amount of separated
  silicon _____ 0.1 gram to 0.72 gram per hour

What is claimed is:

1. Method of producing pure, dense crystallized silicon for use in semiconductors by the thermal decomposition of a halogenated silane containing hydrogen, which comprises passing vapors of a halogenated silane having from one to two hydrogen atoms along and through a heated reaction zone in an amount of from about 0.6 to about 9.5 grams per hour per sq. cm. of cross-sectional area of said reaction zone while differentially heating the reaction zone so as to maintain a temperature gradient along said reaction zone under which the temperature of said reaction zone gradually increases in the direction of vapor flow to a maximum of between 800 and 1150° C. and then decreases gradually from said maximum, and decomposing the halogenated silane while passing along and through said heated reaction zone to form pure, dense, crystallized silicon.

2. Method of producing pure, dense crystallized silicon for use in semiconductors by the thermal decomposition of a halogenated silane containing hydrogen, which comprises passing vapors of a halogenated silane of the group consisting of dichlorosilane, trichlorosilane and tribromosilane along and through a heated reaction zone in an amount of from about 0.6 to about 9.5 grams per hour per sq. cm. of cross-sectional area of said reaction zone while differentially heating the reaction zone so as to maintain a temperature gradient along said reaction zone under which the temperature of said reaction zone gradually increases in the direction of vapor flow to a maximum of between 800 and 1150° C. and then decreases gradually from said maximum, and decomposing the halogenated silane while passing along and through said heated reaction zone to form pure, dense, crystallized silicon.

3. Method in accordance with claim 1 in which the halogenated silane is mixed with an inert gas when heated.

4. Process in accordance with claim 1 wherein a solid body inert to and unreactive with silicon under said temperature conditions is maintained within the heated reaction zone, at least part of the silicon formed being deposited on said body.

5. Process in accordance with claim 4 wherein said solid body is composed of a metal carbide.

6. Process in accordance with claim 4 wherein said solid body is composed of a material of the group consisting of silicon, silicon dioxide and silicon carbide.

7. Process in accordance with claim 4 wherein the position of said solid body relative to the zone of maximum temperature in said heating zone is shifted during said process to cause the silicon to be deposited thereon susbtantially uniformly.

8. Process in accordance with claim 6 wherein the silicon is periodically removed from said solid body.

9. Process in accordance with claim 2 wherein the dichlorosilane is heated to a temperature between 800° C. and 1000° C.

10. Process in accordance with claim 2 wherein the trichlorosilane is heated to a temperature between 850° C. and 1150° C.

11. Process in accordance with claim 2 wherein the tribromosilane is heated to a temperature between 850° C. and 1030° C.

12. Process in accordance with claim 1 wherein the reaction is carried out at from a subatmospheric pressure of 0.26 kg./cm.$^2$ to a superatmospheric pressure of 3.5 kg./cm.$^2$.

References Cited in the file of this patent

UNITED STATES PATENTS 2,441,603    Storks et al. _____ May 18, 1948

FOREIGN PATENTS 1,094,760    France _____ May 24, 1955

OTHER REFERENCES

Mellor: "A Comprehensive Treatise on Inorganic and Theoretical Chemistry," vol. 6, pages 968–969, Longmans, Green & Co., London, 1925.

Parravano et al.: Chem. Abstracts, vol. 17, page 3651, 1923.

Fiat Final Report 789, "Experiments to Produce Ductile Silicon," Smatko, Apr. 3, 1946, pages 1–5.